US011715327B2

(12) United States Patent
Alameh et al.

(10) Patent No.: US 11,715,327 B2
(45) Date of Patent: Aug. 1, 2023

(54) ELECTRONIC DEVICES AND METHODS FOR SELECTING DISPLAY LOCATIONS FOR CONTENT PRESENTATION

(71) Applicant: Motorola Mobility LLC, Chicago, IL (US)

(72) Inventors: Rachid Alameh, Crystal Lake, IL (US); Eric Krenz, Crystal Lake, IL (US); William Groves, Naperville, IL (US); John Gorsica, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 269 days.

(21) Appl. No.: 16/907,529

(22) Filed: Jun. 22, 2020

(65) Prior Publication Data
US 2021/0397815 A1    Dec. 23, 2021

(51) Int. Cl.
*G06V 40/16*        (2022.01)
*G06F 1/16*         (2006.01)
(Continued)

(52) U.S. Cl.
CPC .......... *G06V 40/166* (2022.01); *G06F 1/1647* (2013.01); *G06F 3/017* (2013.01);
(Continued)

(58) Field of Classification Search
CPC .... G06V 40/166; G06V 20/64; G06F 1/1647; G06F 3/017; G06F 21/32; G06F 1/3206; G06F 1/3265; G06F 1/3287; G06F 2200/1637; G06F 1/1626; G06F 1/1694; G06F 1/3262; G06F 3/0346;
(Continued)

(56) References Cited

U.S. PATENT DOCUMENTS 8,947,305 B2   2/2015  Amm et al.
10,761,799 B2 * 9/2020  Disano ................ G06F 1/162
(Continued)

OTHER PUBLICATIONS

"Facial Recognition Technology", Aware Biometrics Software; Unknown publication date but believe to be prior to filing of present application; Viewed online Jul. 13, 2020 https://www.aware.com/facial-recognition/.

(Continued)

*Primary Examiner* — Grant Sitta
(74) *Attorney, Agent, or Firm* — Philip H. Burrus, IV

(57) ABSTRACT

An electronic device includes a first display on a major surface, a second display positioned on another major surface, and optionally at least one imager collocated with the second display. One or more processors identify a predefined event occurring and select whether to present content on the first display or the second display. The one or more processors can cause an imager to capture at least one image. When image matches a first predefined criterion, the one or more processors cause a presentation of content to occur on the first display. When the image matches a second predefined criterion, the one or more processors cause the presentation of the content to occur on the second display. The one or more processors can also compare sizes of the first touch sensitive display portion and the second touch sensitive display portion to select between the first display and the second display.

20 Claims, 7 Drawing Sheets

(51) Int. Cl.
  *G06F 3/01* (2006.01)
  *G06F 21/32* (2013.01)
  *H04M 1/02* (2006.01)
  *G06V 20/64* (2022.01)
(52) U.S. Cl.
  CPC .............. *G06F 21/32* (2013.01); *G06V 20/64* (2022.01); *H04M 1/0266* (2013.01)
(58) Field of Classification Search
  CPC ........... H04M 1/0266; H04M 2250/16; H04M 1/72454; Y02D 10/00
  See application file for complete search history.

(56) References Cited

U.S. PATENT DOCUMENTS

| | | | |
|---|---|---|---|
| 10,809,962 B2* | 10/2020 | Files | G06F 3/1446 |
| 11,616,869 B2* | 3/2023 | Lee | H04M 1/0214 |
| | | | 455/575.3 |
| 2003/0074587 A1 | 4/2003 | Casebolt et al. | |
| 2013/0169348 A1 | 7/2013 | Shi | |
| 2015/0382307 A1 | 12/2015 | Harper et al. | |
| 2016/0154952 A1 | 6/2016 | Venkatraman et al. | |
| 2016/0349792 A1* | 12/2016 | Alameh | G06F 3/0412 |
| 2018/0129262 A1* | 5/2018 | Veiga | G06F 3/0488 |
| 2018/0144721 A1* | 5/2018 | Nemoto | G09G 5/38 |
| 2018/0329672 A1* | 11/2018 | Sadak | G06F 3/0487 |
| 2018/0357040 A1* | 12/2018 | Spiewla | G06F 3/0488 |
| 2019/0114021 A1* | 4/2019 | Oliver | G06F 3/04166 |
| 2019/0163432 A1* | 5/2019 | Files | G06F 3/147 |
| 2022/0245229 A1* | 8/2022 | Zhang | G06F 1/3231 |

OTHER PUBLICATIONS

"Moto G6—Motorola Support", Lenovo Support; Believed to be published prior to filing of present application; Viewed online Jul. 13, 2020 at https://support.motorola.com/us/en/documents/MS127900/.

"Moto X Force", Moto Actions; Published prior to filing of present application; Viewed online Jul. 13, 2020 at http://motorola-global-en-roe.custhelp.com/app/answers/detail/a_id/108525.

"Moto X Pure Edition—Android 6.0 Marshmallow Release Notice", Viewed online Jul. 13, 2020 at https://motorola-global-portal.custhelp.com/app/answers/indevice_detail/a_id/109124/p/30.

"SX9300—Dual Channel Smart Proximity SAR compliant Solution", Semtech; Spec Page; Published Feb. 5, 2014; www.semtech.com.

Braun, et al., "Capacitive proximity sensing in smart environments", Published Jul. 2015; https://www.researchgate.net/publication/279201172_Capacitive_proximity_sensing_in_smart_environments.

Wagnoner, Ara , "Attentive Display Settings on the Moto X", Published Jan. 9, 2015; Viewed Online Jul. 13, 2020 at https://www.androidcentral.com/attentive-display-settings-moto-x.

* cited by examiner

ELECTRONIC DEVICES AND METHODS FOR SELECTING DISPLAY LOCATIONS FOR CONTENT PRESENTATION

BACKGROUND

Technical Field

This disclosure relates generally to electronic devices, and more particularly to electronic devices having oppositely facing displays or display portions.

Background Art

Portable electronic device usage has become ubiquitous. Vast majorities of the population carry a smartphone, tablet computer, or laptop computer daily to communicate with others, stay in formed, to consume entertainment, and to manage their lives.

As the technology incorporated into these portable electronic devices has become more advanced, so to has their feature set. A modern smartphone includes more computing power than a desktop computer did only a few years ago. Additionally, while early generation portable electronic devices included physical keypads, most modern portable electronic devices include touch-sensitive displays. It would be advantageous to have an improved electronic device allowing more intuitive usage of these new features.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
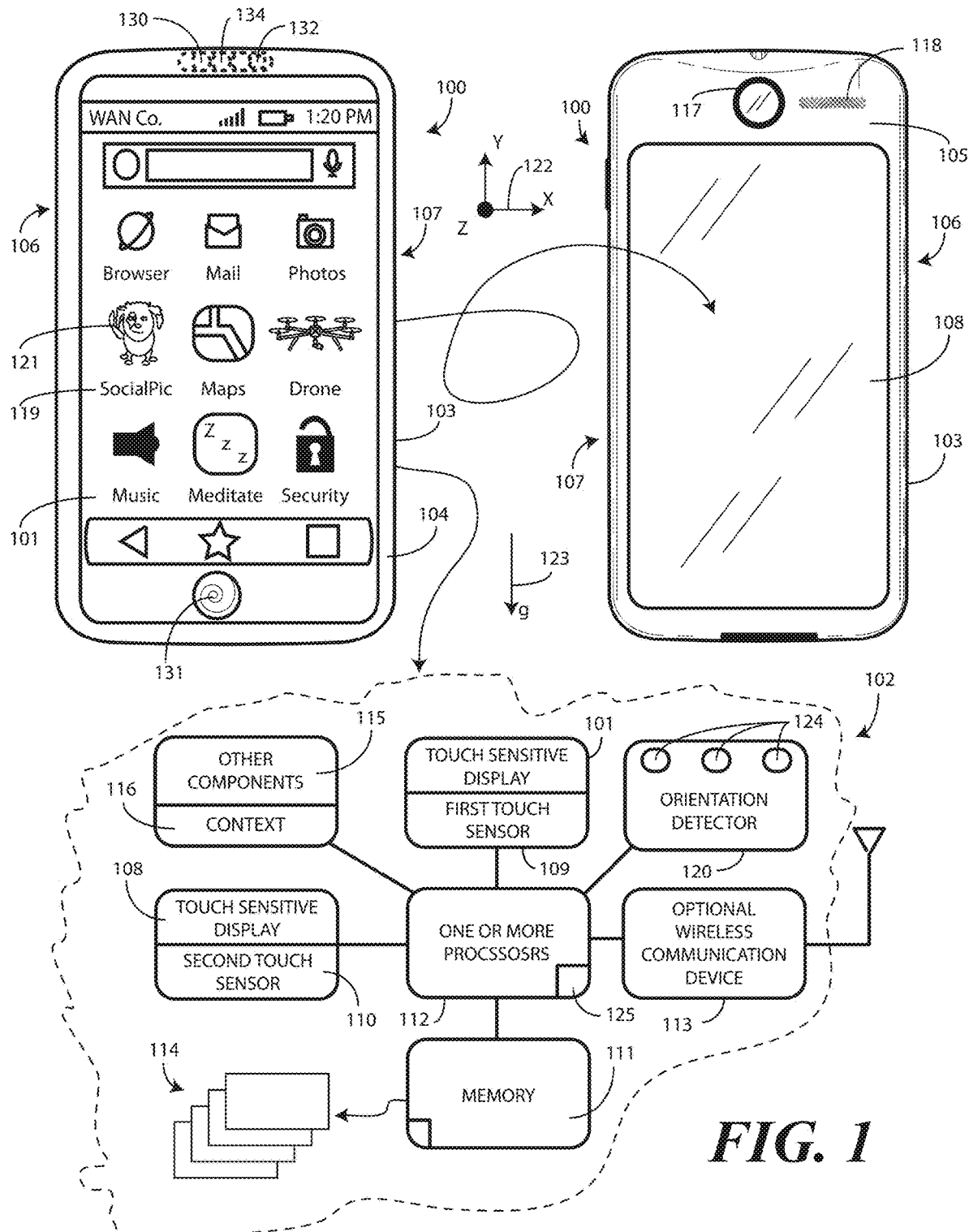
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to selecting, between a front facing display and a rear facing display, upon which display to present content to a user. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of selecting between causing a presentation of content to occur on a first display or causing the presentation of the content to occur on a second display as described herein. The non-processor circuits may include, but are not limited to, a radio receiver, a radio transmitter, signal drivers, clock circuits, power source circuits, and user input devices. As such, these functions may be interpreted as steps of a method to perform causing a presentation of content to occur on a first display or a second display.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, directional terms such as "up," "down," "vertical," "horizontal," are intended to refer to the context of the electronic device being described. For example, a graphical object representing a rotatable item may be presented on a touch sensitive display or surface, where that touch sensitive display is shown in an elevation view around defined X, Y, and Z axes. In those examples, the X-Y plane will define the horizontal, with directions out of the page being defined as the negative Y direction and directions into the page being defined as the positive Y direction. Up will be defined as the positive Z direction and down will be defined as the negative Z direction. Thus, as described below when the rotatable item visually rotates "into the display" or "into the device" or "into the touch sensitive surface, this refers to visual rotation of the rotatable item occurs about an axis lying either within the X-Z plane (when presented in an elevation view), or in the X-Y plane, but askew the Y axis (when presented in a perspective view), with portions of the rotatable item to one side of the axis appearing to move in the positive Y direction, while other portions on the other side of the axis appear to rotate in the negative Y direction, and so forth.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that the design parameters used in designing modern electronic devices, such as smartphones and tablet computers, frequently result in an increasing screen-to-device housing ratio. Said differently, embodiments of the disclosure contemplate that displays of modern electronic devices are getting larger, while the device housings supporting those displays remain relatively constant or get smaller. Embodiments of the disclosure contemplate that many modern electronic devices will also have multiple displays or, alternatively, displays that wrap around a device housing to provide a continuous display around the same. Such devices will therefore have a "front" facing display or display portion (in the case of a single display) and a "rear" facing display or display portion. Embodiments of the disclosure also contemplate that with this increased display surface area, be it from one display or multiple displays, the ability to intuitively and quickly view content being presented on display(s) will provide increased device functionality and an improved user experience.

Advantageously, embodiments of the disclosure provide electronic devices, methods, and systems for transitioning which display—or portion of a single display—is active. Embodiments of the disclosure provide for the use of imager actuation, capture, and analysis after one or more processors identify a predefined event occurring at the electronic device and comparing sizes of touch sensitive display areas receiving static touch input to determine whether to cause a presentation of content to appear on a first display (or display portion) or a second display (or display portion). Using either technique, or a combination of the two, a user can easily interact with an electronic device to have the display (or display portion) they are facing present content, rather than the display (or display portion) facing away from their face. Moreover, embodiments of the disclosure allow the user to quickly, easily, seamlessly and intuitively cause content to switch from one display (or display portion) to another display (or display portion).

In one or more embodiments, when one or more processors of the electronic device identify that a predefined event is occurring at the electronic device, the one or more processors cause an imager to capture an image. Examples of predefined events that may cause the one or more processors to cause the imager to capture the image include the delivery of user authentication credentials, such as a passcode, personal identification number, fingerprint, or facial scan, a cessation of motion or of tilting of the electronic device in three-dimensional space, or when sizes of a first touch sensitive display portion receiving static touch input is approximately equal to a second touch sensitive display portion. Other predefined events will be described below. Still others will be obvious to those of ordinary skill in the art having the benefit of this disclosure.

In one or more embodiments, where the image captured by the imager matches at least a first predefined criterion, the one or more processors of the electronic device cause a presentation of content to occur on the first display. By contrast, where the image captured by the imager matches at least a second predefined criterion, the one or more processors cause the presentation of the content to occur on a second display.

Examples of the first predefined criterion include whether the image depicts a face, what the distance of face to electronic device, whether the face is that of an authorized user of the electronic device, how large the face depicted in the image is, whether an arm is depicted extending from the body of an authorized user of the electronic device, and so forth. Examples of the second predefined criterion include whether only inanimate objects, such as cars, boats, or streetlights, whether any face depicted in the image is unidentifiable, whether faces depicted in the image are too small to be those immediately looking at the display oriented in the direction of the field of view of the imager, and so forth. Other examples of the first criterion and the second criterion will be described below. Still others will be obvious to those of ordinary skill in the art having the benefit of this disclosure.

In other embodiments, the imager is not used in the selection of whether to cause a presentation of content to occur on the first display (or display portion) or the second display (or display portion). Instead, a comparison of an amount of area along the first display (or display portion) receiving touch input with another area along the second display (or display portion) is used to select the proper display for content presentation. Embodiments of the disclosure contemplate that when a person grips an electronic device such as a smartphone, their fingers or hand tend to cover more area on the rear side of the electronic device than the front side of the electronic device. Accordingly, in one or more embodiments one or more processors operable with a first display (or display portion) and a second display (or display portion) compare sizes of a first touch sensitive display portion receiving static touch input and a second touch sensitive display portion receiving other static touch input. In one or more embodiments, when the first touch sensitive display portion is greater than the second touch sensitive display portion, the one or more processors cause the presentation of content to occur on the first touch sensitive display (or display portion). By contrast, when the second touch sensitive display portion is greater than the first touch sensitive display portion, the one or more processors cause the presentation of the content to occur on the second touch sensitive display (or display portion).

In one or more embodiments, regardless of what technique is used to select the display or display portion will be used to present content, the display or display portion that is not selected to present content can operate in various modes. Since this display is not presenting content, in one or more embodiments it can simply become deactivated. In another embodiment, one or more processors of the electronic device can cause the display to transition to a wallpaper mode of operation where it presents an image, pattern, or other static content. Other examples of operating modes for the display at which the presentation of content has ceased will be obvious to those of ordinary skill in the art having the benefit of this disclosure.

Embodiments of the disclosure thus advantageously provide novel and useful mechanisms suitable for use in an electronic device having multiple displays (or display portions), with a first display or display portion positioned on a first major surface of the electronic device and a second display or display portion positioned on a second major surface of the electronic device. The methods, systems, and devices described herein advantageously provide a more intuitive user input experience than do prior art systems.

Turning now to FIG. 1, illustrated therein is one explanatory electronic device 100 configured in accordance with one or more embodiments of the disclosure. It should be noted that the electronic device 100 can be configured to be various types of devices. In one embodiment, the electronic device 100 is a portable electronic device, one example of which is a smartphone that will be used in the figures for illustrative purposes. However, it should be obvious to those of ordinary skill in the art having the benefit of this disclosure that the electronic device 100 could be other types of devices as well, including palm-top computers, tablet computers, gaming devices, media players, wearable devices, or other portable wireless communication devices. Still other devices will be obvious to those of ordinary skill in the art having the benefit of this disclosure.

Also illustrated in FIG. 1 is one explanatory block diagram schematic 102 of the explanatory electronic device 100 of FIG. 1. It should be understood that FIG. 1 is provided for illustrative purposes only and for illustrating components of one electronic device 100 in accordance with embodiments of the disclosure, and is not intended to be a complete block diagram schematic 102 of the various components that can be included with the electronic device 100. Therefore, other electronic devices in accordance with embodiments of the disclosure may include various other components not shown in FIG. 1, or may include a combination of two or more components or a division of a particular component into two or more separate components, and still be within the scope of the present disclosure.

In one or more embodiments, the block diagram schematic 102 is configured as a printed circuit board assembly disposed within a housing 103 of the electronic device 100. Various components can be electrically coupled together by conductors or a bus disposed along one or more printed circuit boards.

The illustrative block diagram schematic 102 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

In one or more embodiments, the housing 103 of the electronic device 100 defines a first major surface 104 and a second major surface 105. In one or more embodiments, the first major surface 104 and the second major surface 105 are separated by one or more minor surfaces 106,107. In one or more embodiments, a user interface of the electronic device 100 includes a first display 101 positioned on the first major surface 104 of the electronic device 100. In one or more embodiments, the user interface also includes a second display 108 positioned on the second major surface 105 of the electronic device 100.

It should be noted that while an electronic device 100 having a first display 101 and a second display 108 is used in the figures for illustrative purposes, embodiments of the disclosure contemplate that modern electronic devices can include a single display that wraps about the housing 103 of the electronic device 100. For example, the single display may have a first portion that serves as the first display 101, a second portion that wraps around minor surface 106, and a third portion that serves as the second display 108. Thus, while an electronic device 100 with two displays is described as an explanatory embodiment below, in other embodiments the first display 101 can be replaced with a first portion of a single display, with the second display 108 being replaced by a second portion of the single display. The descriptions below could, therefore be repeated, with first portion of one display being substituted for the first display 101, and second portion of one display being substituted for the second display 108, and so forth. Those of ordinary skill in the art having the benefit of this disclosure will intuitively understand this alternate embodiment having read the description below in conjunction with this paragraph, thereby allowing the present specification to be significantly reduced in length.

In one or more embodiments, both the first display 101 and the second display 108 comprise touch sensitive displays. Where so configured, information, graphical objects, user actuation targets, and other graphical indicia can be presented either on the front of the electronic device 100, using the first display 101, which is touch sensitive, or on the back of the electronic device 100, using the second display 108, which is also touch sensitive. In one or more embodiments, so as to be touch sensitive, each of the first display 101 and the second display 108 comprise a corresponding touch sensor. As shown in FIG. 1, in one or more embodiments, the first display 101 includes a first touch sensor 109, while the second display 108 includes a second touch sensor 110.

In one or more embodiments, each of the first touch sensor 109 and the second touch sensor 110 can comprise any of a capacitive touch sensor, an infrared touch sensor, resistive touch sensors, inductive touch, infrared touch, another touch-sensitive technology, or combinations thereof. Capacitive touch-sensitive devices include a plurality of capacitive sensors, e.g., electrodes, which are disposed along a substrate. Where so configured, each capacitive sensor can be configured, in conjunction with associated control circuitry, e.g., the one or more processors 112 operable with the first display 101 and the second display 108, to detect an object in close proximity with—or touching—the surface of the first display 101 and/or the surface of the second display 108 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

In one or more embodiments, users can deliver user input to the first display 101 and/or the second display 108 by delivering touch input from a finger, stylus, or other objects disposed proximately with the first display 101 and/or the second display 108. In one embodiment, the first display 101 and the second display 108 are configured as an active matrix organic light emitting diode (AMOLED) display. However, it should be noted that other types of displays, including liquid crystal displays, are suitable for use with the user interface and would be obvious to those of ordinary skill in the art having the benefit of this disclosure.

Other features can be situated on either the first major surface 104 or the second major surface 105 in addition to the first display 101 and/or the second display 108. For instance, a user interface component such as a button or other control device can also be disposed on either the first major surface 104 or the second major surface 105 to facilitate additional control of the electronic device 100. Other features can be added, and can be located on the front of the housing 103, sides of the housing 103, or the rear of the housing 103. Illustrating by example, in one or more embodiments an imager 117 or a loudspeaker 118 can be positioned on either the first major surface 104 or the second major surface 105.

In one or more embodiments, the electronic device 100 includes only a single imager 117 situated on the second major surface 105 of the electronic device 100. However, in other embodiments the electronic device 100 will include a front facing imager 130 as well.

In one embodiment, the electronic device includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 102. Each of the application processor and the auxiliary processor(s) can be configured to process and execute executable software code to perform the various functions of the electronic device with which the block diagram schematic 102 operates. For example, in one embodiment the one or more processors 112 comprise one or more circuits operable to present content or presentation information, such as images, text, and video, on the first display 101 and the second display 108. A storage device, such as memory 111, can optionally store the executable software code used by the one or more processors 112 during operation.

As shown in FIG. 1, the one or more processors 112 are presenting content 119 on the first display 101. The content 119 of this illustration comprises one or more graphical objects. In one or more embodiments, such content 119 is retrieved, using the communication circuit 113, from one or more remote servers. The content 119 can be retrieved locally from the memory 111 as well. The content 119 can include one or more user actuation targets 121, which a user can touch to execute operations such as launching an application, opening a web page, navigating to a different screen, and so forth.

In this illustrative embodiment, the block diagram schematic 102 also includes a communication circuit 113 that can be configured for wired or wireless communication with one or more other devices or networks. The networks can include a wide area network, a local area network, and/or personal area network. The communication circuit 113 may also utilize wireless technology for communication, such as, but are not limited to, peer-to-peer or ad hoc communications such as HomeRF, Bluetooth and IEEE 802.11, and other forms of wireless communication such as infrared technology. The communication circuit 113 can include wireless communication circuitry, one of a receiver, a transmitter, or transceiver, and one or more antennas.

In one embodiment, the one or more processors 112 can be responsible for performing the primary functions of the electronic device with which the block diagram schematic 102 is operational. For example, in one embodiment the one or more processors 112 comprise one or more circuits operable with the first display 101 and the second display 108 to present presentation information or content to a user. The executable software code used by the one or more processors 112 can be configured as one or more modules 114 that are operable with the one or more processors 112. Such modules 114 can store instructions, control algorithms, and so forth.

Other components 115 can be included with the electronic device 100. Illustrating by example, the other components 115 can include an audio input/processor. The audio input/processor can receive audio input from an environment about the electronic device 100. The audio input/processor can include hardware, executable code, and speech monitor executable code in one embodiment.

The audio input/processor can be operable with one or more predefined authentication references stored in memory 111. The predefined authentication references can comprise representations of basic speech models, representations of trained speech models, or other representations of predefined audio sequences that are used by the audio input/processor to receive and identify voice commands that are received with audio input captured by an audio capture device. In one embodiment, the audio input/processor can include a voice recognition engine. Regardless of the specific implementation utilized in the various embodiments, the audio input/processor can access various speech models stored with the predefined authentication references to identify speech commands. The audio input/processor can also include one or more audio input devices, such as one or more microphones.

In one or more embodiments, the other components 115 can include various sensors operable with the one or more processors 112. These sensors can include a geo-locator that serves as a location detector, an orientation 120 that determines an orientation and/or movement of the electronic device 100 in three-dimensional space 122, an imager 117, a face analyzer, an environmental analyzer, and gaze detector.

Illustrating by example, in one or more embodiments one or more motion sensors 124 can be configured as an orientation detector 120 that determines an orientation and/or movement of the electronic device 100 in three-dimensional space 122. Illustrating by example, the orientation detector 120 can include an accelerometer, gyroscope(s), or other device to detect device orientation and/or motion of the electronic device 100. Using an accelerometer as an example, an accelerometer can be included to detect motion of the electronic device 100 in the three-dimensional space 122. Additionally, the accelerometer can be used to sense some of the gestures of the user, such as one talking with their hands, running, or walking.

In one or more embodiments, the orientation detector 120 can determine the spatial orientation of an electronic device 100 in three-dimensional space 120 by, for example, detecting a gravitational direction 123. In addition to, or instead of, an accelerometer, an electronic compass can be included to detect the spatial orientation of the electronic device 100 relative to the earth's magnetic field. Similarly, one or more gyroscopes can be included to detect rotational orientation of the electronic device 100 in the three-dimensional space 122. Other examples of orientation detectors will be obvious to those of ordinary skill in the art having the benefit of this disclosure.

The other components 115 can also include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 115 can also include proximity sensors. The proximity sensors can fall in to one of two camps: active proximity sensors that include a transmitter and receiver pair, and "passive" thermal or ultrasonic proximity sensors that include a receiver only. Either the proximity detector components or the proximity sensor components can be generally used for gesture control and other user interface protocols in one or more embodiments.

The other components 115 can optionally include a barometer operable to sense changes in air pressure due to elevation changes or differing pressures of the electronic device 100. The other components 115 can also optionally include a light sensor that detects changes in optical intensity, color, light, or shadow in the environment of an electronic device.

A context engine 116 can then operable with the other components 115 to detect, infer, capture, and otherwise determine persons and actions that are occurring in an environment about the electronic device 100. For example, where included one embodiment of the context engine 116 determines assessed contexts and frameworks using adjustable algorithms of context assessment employing information, data, and events. These assessments may be learned through repetitive data analysis. Alternatively, a user may employ the user interface to enter various parameters, constructs, rules, and/or paradigms that instruct or otherwise guide the context engine 116 in detecting multi-modal social cues, emotional states, moods, and other contextual information. The context engine 116 can comprise an artificial neural network or other similar technology in one or more embodiments.

One or more user authentication devices can be included in the electronic device 100 to determine whether a person attempting to use the electronic device 100 is an authorized user of the electronic device 100. Illustrating by example, in one or more embodiments the authentication device comprises a fingerprint sensor 131. However, the authentication device can take other forms as well. For example, in another embodiment the authentication device can comprise an imager 130 that performs facial recognition analysis. In another embodiment, the authentication device comprises an audio input device 134 that performs voice recognition analysis on received audio input. In still another embodiment, the authentication device comprises a depth scanner 132 that obtains a depth scan of any faces within its field of view. In still other embodiments, the authentication device can simply comprise one of the first display 101 or the second display 108, with which a user may enter a signature or personal identification number (PIN). Regardless of type, in one or more embodiments the authentication device is configured to process authentication data received by the authentication device to determine whether the authentication data is received from, or belongs to, an authorized user of the electronic device 100. The various authentication devices listed above are illustrative only, and can be used alone or in combination. Other examples of authentication devices will be obvious to those of ordinary skill in the art having the benefit of this disclosure.

Figure 2:
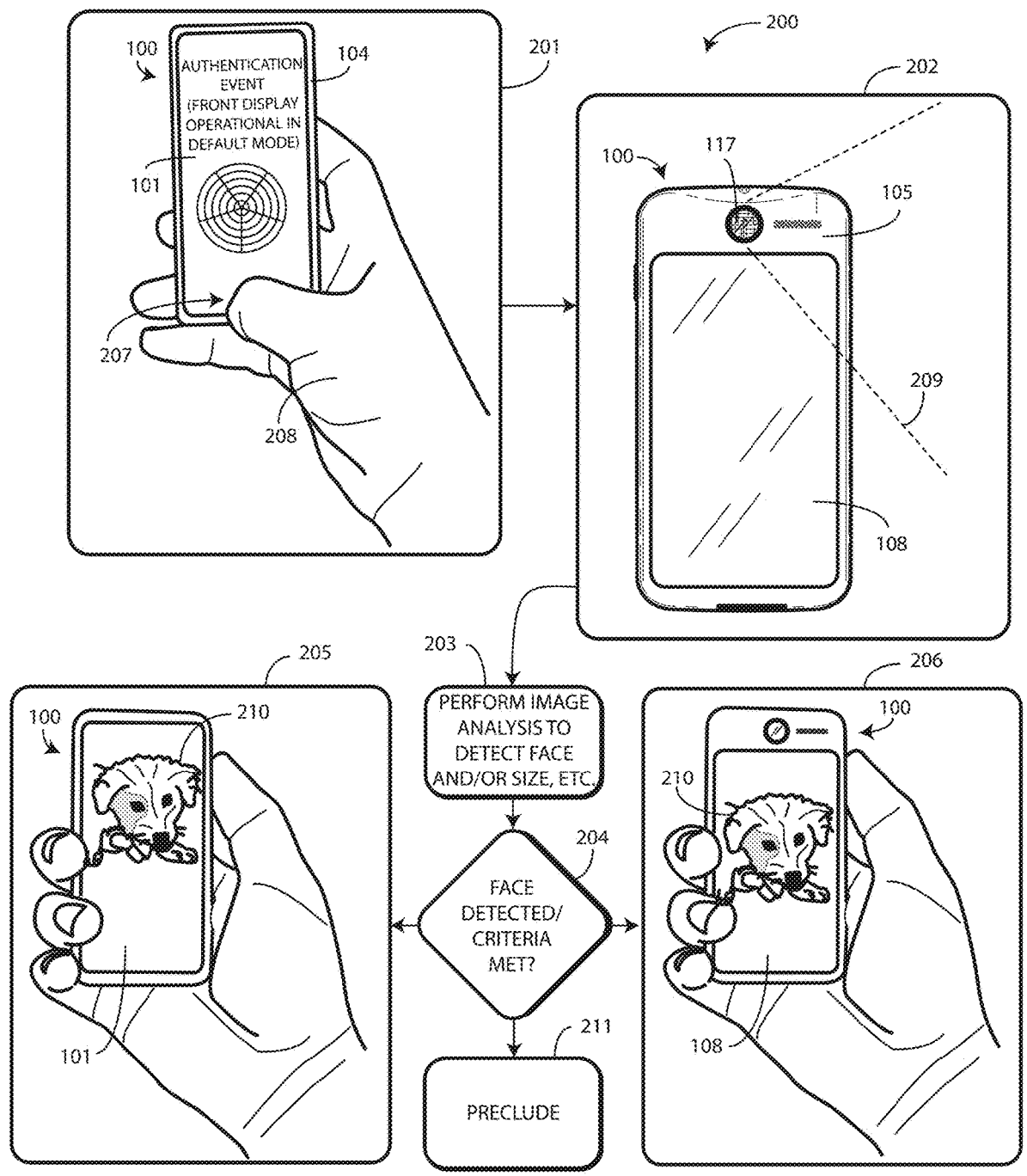
FIG. 2 illustrates one explanatory electronic device executing or more explanatory operating steps in accordance with one or more embodiments of the disclosure.

Now that various hardware components have been described, attention will be turned to methods of using electronic devices in accordance with one or more embodiments of the disclosure, operating steps performed by electronic devices in accordance with one or more embodiments of the disclosure, and advantages, features, and benefits provided by electronic devices configured in accordance with embodiments of the disclosure. Turning first to FIG. 2, illustrated therein is one explanatory method 200 for using the electronic device 100 of FIG. 1 to quickly, easily, and simply ensure that content is presented on the display facing the user, rather than the display facing away from the user. The method 200 of FIG. 2 illustrates one explanatory electronic device 100 executing or more explanatory operating steps in accordance with one or more embodiments of the disclosure. Other methods will be described thereafter with reference to FIGS. 3-5.

In the method 200 of FIG. 2, any time user authentication credentials are delivered to an authentication device to unlock or otherwise allow access to the electronic device 100, one or more processors (112) of the electronic device (100) cause an imager 117,(130) to capture an image. In one embodiment, where the electronic device 100 includes only an imager 117 on the second major surface 105, the one or more processors (112) cause this rear-facing imager to capture an image. Where the electronic device 100 includes an imager (130) on the first major surface 104 and another imager 117 on the second major surface 105, the one or more processors (112) can cause one or both imagers to capture images.

Once the image has been captured, the one or more processors (112) perform image analysis on the image. Where the electronic device 100 includes only an imager 117 on the second major surface 105, if a face with an associated close distance is depicted in the image the one or more processors (112) cause the second display 108 to present content. By contrast, if the one or more processors (112) fail to detect a face depicted in the image, the one or more processors (112) cause the content to be presented on the first display 101.

Where the electronic device 100 includes only an imager (130) on the first major surface 104, if a face is depicted in the image the one or more processors (112) cause the first display 101 to present content. By contrast, if the one or more processors (112) fail to detect a face depicted in the image, the one or more processors (112) cause the content to be presented on the second display 108.

Where the electronic device 100 includes an imager (130) positioned on the first major surface 104 and another imager 117 on the second major surface 105, the one or more processors (112) can cause one or both imagers to capture images. If the image captured by the imager (130) positioned on the first major surface 104 depicts a face, and the image captured by the imager 117 positioned on the second major surface 105 does not, in one or more embodiments the one or more processors (112) cause the first display 101 to present content. By contrast, if the image captured by the imager 117 positioned on the second major surface 105 depicts a face, and the image captured by the imager (130) positioned on the first major surface 104 does not, the one or more processors (112) cause the content to be presented on the second display 108.

Where the electronic device 100 includes only an imager 117 on the second major surface 105, and if only inanimate objects such as a street or faraway cars are depicted in the image, in one or more embodiments the one or more processors (112) cause the content to be presented on the first display 101. Similarly, if only a hand—rather than a face—is depicted in the image, the one or more processors (112) cause the content to be presented on the first display 101.

Embodiments of the disclosure contemplate that if a face is depicted in an image, the size of the face detected can also important. Illustrating by example, in one or more embodiments the one or more processors (112) can perform image analysis on the image, and in particular the size of the face depicted in the image, to determine whether that face is reasonably attached to a torso within a predefined distance, such as an average arm's reach, of the electronic device 100. Such a mechanism prevents a person from directing the imager 117 toward someone to take a picture and having content transition from being presented on the first display 101 to the second display 108.

Embodiments of the disclosure also contemplate that a surface of the electronic device 100 can include multiple imagers. For example, if the second major surface 105 includes two imagers, when the predefined condition occurs, the one or more processors (112) cause the imager having the widest field of view to capture the image. Similarly, if the first major surface 104 (or second major surface 105) is equipped with a depth imager (132) in addition to an imager (130), these devices can be used to look for the face of an authorized user of the electronic device when ambient (visible) light levels are low.

In one or more embodiments, a default mode of the one or more processors (112), which is editable using a menu and user settings, causes content to be presented on the first display 101 when no predefined event is detected. In one or more embodiments, the method 200 of FIG. 2 is used with an electronic device 100 having only one imager 117, which is positioned on the second major surface 105 of the electronic device. When the authentication device of the electronic device 100 receives input, in one or more embodiments the one or more processors (112) of the electronic device actuate this imager 117. After performing image analysis on the image, when the one or more processors (112) detect a face being depicted in the image, the one or more processors (112) cause content to be presented on the first display 101. By contrast, where no face is detected as being depicted in the image, the one or more processors (112) cause the content to be presented on the first display 101.

To illustrate this method 200 in further detail, the method 200 begins at step 201 where an electronic device 100 includes a first display 101 positioned on a first major surface 104 of the electronic device 100. As shown at step 202, the electronic device 100 also includes a second display 108 positioned on a second major surface 105 of the electronic device 100. Additionally, an imager 117 is positioned on the second major surface 105 of the electronic device 100. As described above with reference to FIG. 1, the electronic device 100 includes one or more processors (112) that are operable with the first display 101, the second display 108, and the imager 117.

At step 201, an authentication device, shown illustratively in FIG. 2 as the fingerprint sensor (131), is receiving authentication input 207 that will be analyzed to determine whether the person 208 delivering the authentication input 207 is an authorized user of the electronic device 100. At step 201, the one or more processors (112) of the electronic device 100 identify this receipt of authentication input 207 as a predefined event occurring at the electronic device 100.

At step 202, in response to the one or more processors (112) identifying the predefined event of a person delivering authentication input 207, cause the imager 117 to capture at least one image 209. At step 203, the one or more processors (112) of the electronic device 100 perform an image analysis operation upon the at least one image 209. Decision 204 then determines whether the at least one image 209 matches a predefined criterion. When the at least one image 209 matches a first predefined criterion, as determined at decision 204, the one or more processors (112) of the electronic device 100 cause a presentation of content 210 to occur on the first display 101 of the electronic device 100 at step 205. By contrast, when the at least one image 209 matches a second predefined criterion, as determined at decision 204, the one or more (112) of the electronic device cause the presentation of the content 210 to occur on the second display 108 at step 206.

Figure 6:
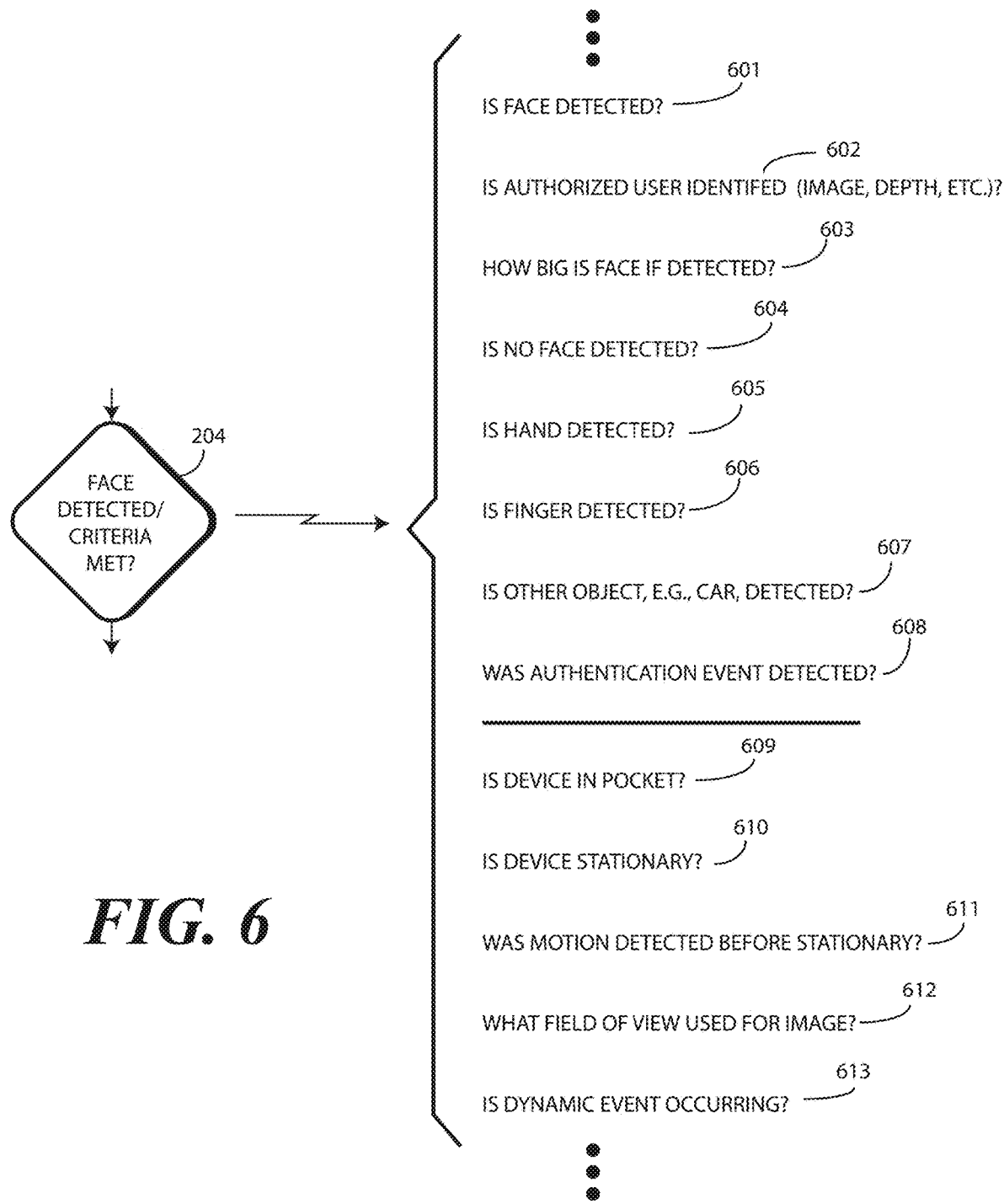
FIG. 6 illustrates examples of user input triggering one or more processors to transition the presentation of content in accordance with one or more embodiments of the disclosure.

The predefined criterion that the at least one image 209 must meet can vary. Turning briefly to FIG. 6, illustrated therein are a few example criteria suitable for determination at decision 204. The criteria set forth in FIG. 6 can be used for the first predefined criterion or the second predefined criterion. Moreover, the example criteria shown in FIG. 6 are illustrative only, and are not intended to form an inclusive list. Numerous other criteria suitable for determination at decision 204 will be obvious to those of ordinary skill in the art having the benefit of this disclosure.

In one or more embodiments, the predefined criterion 601 comprises whether a face is depicted in the at least one image (209). In one or more embodiments, when a face is depicted in the at least one image (209), the one or more processors (112) of the electronic device 100 cause the presentation of the content (210) to occur on the second display (108), which is positioned on the same major surface (105) as the imager (117). By contrast, when there is no face depicted in the at least one image (209), in one or more embodiments the one or more processors (112) of the electronic device cause the presentation of the content (210) to occur on the first display (101).

In another embodiment, the predefined criterion 602 comprises whether the at least one image (209) depicts an authorized user of the electronic device (100) looking at the second major surface (105) of the electronic device (100). In one or more embodiments, when the at least one image (209) depict an authorized user looking at the second major surface (105) of the electronic device (100), the one or more processors (112) of the electronic device 100 cause the presentation of the content (210) to occur on the second display (108), which is positioned on the same major surface (105) as the imager (117). By contrast, when the at least one image (209) fails to depict the authorized user looking at the second major surface (105), in one or more embodiments the one or more processors (112) of the electronic device cause the presentation of the content (210) to occur on the first display (101).

In another embodiment, the predefined criterion 603 comprises the at least one image (209) depicting a face having a size exceeding a predefined image area threshold. Embodiments of the disclosure contemplate that when the at least one image (209) depicts a face, the size of the face can be important. Faces far away are likely not users using the electronic device (100). By contrast, faces filling the frame of the at least one image (209) are likely users using the electronic device (100). Thus, in one or more embodiments the predefined criterion 603 comprises the depicted face exceeding a predefined image area threshold. This predefined image area threshold will vary as a function of field of view of the imager (117), but in one or more embodiments the predefined image area threshold is at least twenty-five percent of the image. Thus, In one or more embodiments, when the at least one image (209) depicts a face having a size exceeding a predefined image area threshold, the one or more processors (112) of the electronic device 100 cause the presentation of the content (210) to occur on the second display (108), which is positioned on the same major surface (105) as the imager (117). By contrast, when the at least one image (209) fails to depict a face having a size exceeding the predefined image area threshold, in one or more embodiments the one or more processors (112) of the electronic device cause the presentation of the content (210) to occur on the first display (101).

In still another embodiment, the predefined criterion 604 comprises whether the at least one image (209) fails to depict a face, optionally within a predefined distance from the electronic device. In one or more embodiments, when a face is depicted in the at least one image (209), the one or more processors (112) of the electronic device 100 cause the presentation of the content (210) to occur on the second display (108), which is positioned on the same major surface (105) as the imager (117). By contrast, when there is no face depicted in the at least one image (209), in one or more embodiments the one or more processors (112) of the electronic device cause the presentation of the content (210) to occur on the first display (101).

In one or more embodiments, the predefined criterion 605 comprises whether a hand is depicted in the at least one image (209). In one or more embodiments, when a hand is depicted in the at least one image (209), this is indicative of the imager being covered—or partially covered—by a user who is holding the electronic device (100) while looking at the other display, i.e., the first display (101). Accordingly, the one or more processors (112) of the electronic device 100 cause the presentation of the content (210) to occur on the first display (101), which is positioned opposite the major surface (105) of the imager (117). By contrast, when there is no hand depicted in the at least one image (209), in one or more embodiments the one or more processors (112) of the electronic device cause the presentation of the content (210) to occur on the second display (108).

In one or more embodiments, the predefined criterion 606 comprises whether a finger is depicted in the at least one image (209). In one or more embodiments, when a finger is depicted in the at least one image (209), this is indicative of the imager being covered—or partially covered—by a user who is holding the electronic device (100) while looking at the other display, i.e., the first display (101). Accordingly, the one or more processors (112) of the electronic device 100 cause the presentation of the content (210) to occur on the first display (101), which is positioned opposite the major surface (105) of the imager (117). By contrast, when there is no finger depicted in the at least one image (209), in one or more embodiments the one or more processors (112) of the electronic device cause the presentation of the content (210) to occur on the second display (108).

In one or more embodiments, the predefined criterion 607 comprises whether an inanimate object, such as a car, boat, street light, house, or other inanimate object, is depicted in the at least one image (209). In one or more embodiments, when an inanimate object is depicted in the at least one image (209), this is indicative of the imager being oriented away from a user who is holding the electronic device (100) while looking at the other display, i.e., the first display (101). Accordingly, the one or more processors (112) of the electronic device 100 cause the presentation of the content (210) to occur on the first display (101), which is positioned opposite the major surface (105) of the imager (117). By contrast, when there is no finger depicted in the at least one image (209), in one or more embodiments the one or more processors (112) of the electronic device cause the presentation of the content (210) to occur on the second display (108).

Turning now back to FIG. 2, in addition to determining whether the at least one image 209 matches one or more criteria, decision 204 can also determine whether one or more conditions are met when the at least one image 209 is captured. In one or more embodiments, when decision 204 determines that a first condition is met, the one or more processors (112) can present the content 210 on either the first display 101 at step 205 or on the second display 108 at step 206, depending upon whether the at least one image 209 matches a first predefined criterion or a second predefined criterion. However, where decision 204 determines that the first condition is not met, or alternatively that a second condition is met, the one or more processors (112) of the electronic device 100 can preclude one or both of the presentation of the content 210 or, where a content presentation is already occurring, the presentation of the content 210 being swapped from one display to the other display at step 211, even when the at least one image 209 meets a predefined criterion.

Just as with the predefined criterion for the at least one image 209, the conditions determined at decision 204 can vary. Turning briefly now back to FIG. 6, in one or more embodiments a first condition 608 comprises an authentication event triggering the imager (117) to capture the at least one image (209). In the example of FIG. 2 above, the authentication event comprises a person (208) delivering fingerprint data to a fingerprint sensor (131) to authenticate herself as an authorized user of the electronic device (100). In other embodiments, the authentication event can comprise a depth scanner capturing a depth scan of the person (208), the person (208) entering a password or personal identification number, and so forth. In one or more embodiments, if an authentication event triggers the imager (117) capturing the at least one image (209), the one or more processors (112) allow the presentation of the content (210) on either the first display (101) or the second display (108). By contrast, if the electronic device (100) is in motion or rotation in three-dimensional space when the at least one image (209) is captured, the one or more processors (112) may preclude one or both of the presentation of the content (210) or, where a content presentation is already occurring, the presentation of the content (210) being swapped from one display to the other display at step (211), even when the at least one image (209) meets a predefined criterion.

In another embodiment, the condition 609 comprises whether the electronic device 100 is in a pocket when the at least one image (209) is captured. Embodiments of the disclosure contemplate that an authorized user of the electronic device (100) may inadvertently deliver, for example, fingerprint data to the fingerprint sensor (131) when grasping the electronic device (100) while the electronic device (100) is positioned within a pocket. Accordingly, in one or more embodiments if the electronic device (100) is positioned within a pocket when the at least one image (209) is captured, the one or more processors (112) preclude the presentation of the content (210) at step (211) of FIG. 2.

In another embodiment, the condition 610 comprises the electronic device (100) being stationary when the at least one image (209) is captured. In one or more embodiments, as will be described below with reference to FIG. 3, the predefined event triggering the one or more processors (112) of the electronic device (100) to cause the imager (117) to capture the at least one image (209) comprises the electronic device (100) coming to a stationary pause, as would be the case when a person (208) is engaging or viewing a display of the electronic device (100). Accordingly, in one or more embodiments when the electronic device (100) is experiencing a momentary or longer in duration pause, the one or more processors (112) allow the presentation of the content (210) on either the first display (101) or the second display (108). By contrast, if the electronic device (100) is in motion or rotation in three-dimensional space when the at least one image (209) is captured, the one or more processors (112) may preclude one or both of the presentation of the content (210) or, where a content presentation is already occurring, the presentation of the content (210) being swapped from one display to the other display at step (211), even when the at least one image (209) meets a predefined criterion.

In another embodiment, to ensure that the stationary state occurring when the at least one image (209) is captured is a pause in motion, rather than when the electronic device (100) is sitting on a table, the condition 611 comprises the electronic device (100) being in motion prior to becoming stationary when the at least one image (209) is captured. Accordingly, in one or more embodiments when the electronic device (100) is experiencing a momentary or longer in duration pause while the imager (117) captures the at least one image (209) after experiencing motion, the one or more processors (112) allow the presentation of the content (210) on either the first display (101) or the second display (108). By contrast, if the electronic device (100) was not in motion or rotation in three-dimensional space prior to the pause causing the at least one image (209) to be captured, the one or more processors (112) may preclude one or both of the presentation of the content (210) or, where a content presentation is already occurring, the presentation of the content (210) being swapped from one display to the other display at step (211), even when the at least one image (209) meets a predefined criterion.

In another embodiment, the condition 612 comprises a predefined field of view of the imager (117). Embodiments of the disclosure contemplate that when, for example, an electronic device (100) comprises multiple imagers on a major surface, when capturing the at least one image (209) the imager with the widest field of view should be used. Accordingly, in one or more embodiments when the imager with the widest field of view is used to capture the at least one image (209), the one or more processors (112) allow the presentation of the content (210) on either the first display (101) or the second display (108). By contrast, if an imager with narrower field of view is used to capture the at least one image (209), the one or more processors (112) may preclude one or both of the presentation of the content (210) or, where a content presentation is already occurring, the presentation of the content (210) being swapped from one display to the other display at step (211), even when the at least one image (209) meets a predefined criterion.

In still another embodiment, the condition 613 comprises a dynamic event occurring at one of the displays. Embodiments of the disclosure contemplate that when content (210) is being presented on a display when the predefined event occurs, and a person (208) is interacting with the content (210), it would not be beneficial to cause the presentation of the content (210) to switch from one display to another. Accordingly, in one or more embodiments when a user is interacting with content (210) being presented on a display, the one or more processors (112) preclude the presentation of the content (210) being swapped from one display to the other display at step (211), even when the at least one image (209) meets a predefined criterion. Additionally, as noted above with reference to FIG. 4, embodiments of the disclosure can distinguish between static touch, proximity, or gesture input and dynamic touch, gesture, or proximity input to preclude dynamic and brief touches, such as user inputting/interacting with touch screens for example, from causing a change in which display is presenting content.

Turning now back to FIG. 2, as explained above the predefined event occurring at the electronic device 100 at step 201 comprises a user authentication event authorizing a person 208 to be an authorized user of the electronic device 100. To wit, the person 208 is executing a user authentication event at step 201 by delivering fingerprint data to a fingerprint sensor (131) at step 201. However, using the conditions (608-613) of FIG. 6, the method 200 could be reconfigured by substituting another activity as the predefined event of step 201 triggering the imager 117 capturing the at least one image 209 at step 202.

Illustrating by example, in another embodiment the predefined event occurring at step 201 comprises an inversion of the electronic device 100 in three-dimensional space. In one or more embodiments, when the one or more processors (112) of the electronic device 100 detect the electronic device 100 being inverted in three-dimensional space, such as when the person 208 flips the electronic device 100 over in their hand at step 201, the one or more processors cause the imager 117, at step 202, to capture the at least one image 209. Thereafter, as before, if the at least one image 209 matches at a first predefined criterion, which could be any of those described above with reference to FIG. 6 or another criterion, as determined at decision 204, the one or more processors (112) cause a presentation of content 210 on the first display 101 at step 205. By contrast, when the at least one image 209 matches a second predefined criterion, which could be another of the criteria in FIG. 6 or another criterion, the one or more processors (112) cause the presentation of the content 210 to occur on the second display 108 at step 206.

In one or more embodiments, the method 200 can repeat. Said differently, in one or more embodiments the one or more processors (112) cause, at step 202, the imager 117 to capture the at least one image 209 each time the predefined event occurs at step 201. Thus, if the predefined event is a user authentication event at step 201, in one or more embodiments the one or more processors (112) cause the imager 117 to capture the at least one image 209 each time an authentication event is detected. Similarly, if the predefined event occurring at step 201 comprises an inversion of the electronic device 100 in three-dimensional space, with a momentary pause thereafter, in one or more embodiments the one or more processors (112) cause the imager 117 to capture the at least one image 209 each time an inversion followed by a pause occurs, and so forth.

What happens to the display not presenting the content, e.g., the second display 108 at step 205 or the first display 101 at step 206, can vary. In one or more embodiments, the non-presenting display can change to another mode of operation. For example, in one embodiment, the one or more processors (112) of the electronic device 100 can simply deactivate the non-presenting display. Thus, in one or more embodiments step 205 would comprise deactivating the second display 108 when the at least one image 209 matches the first predefined criterion. Similarly, step 206 would comprise deactivating the first display 101 when the at least one image 209 matches the second predefined criterion.

In another embodiment, the one or more processors (112) of the electronic device 100 can cause the non-presenting to transition to a wallpaper mode of operation where it presents an image, pattern, or other static content. In still other embodiments, the one or more processors (112) of the electronic device 100 can suppress the sensitivity of the touch sensors associated with the non-presenting. Illustrating by example, when the second display 108 is presenting the content 210 as shown at step 206, the touch sensors of the first display 101 can be largely suppressed such that touch events occurring at the first display 101 are now largely suppressed or ignored. These operating modes are illustrative only, as numerous other examples of operating modes for the display at which the presentation of content has ceased will be obvious to those of ordinary skill in the art having the benefit of this disclosure.

Figure 3:
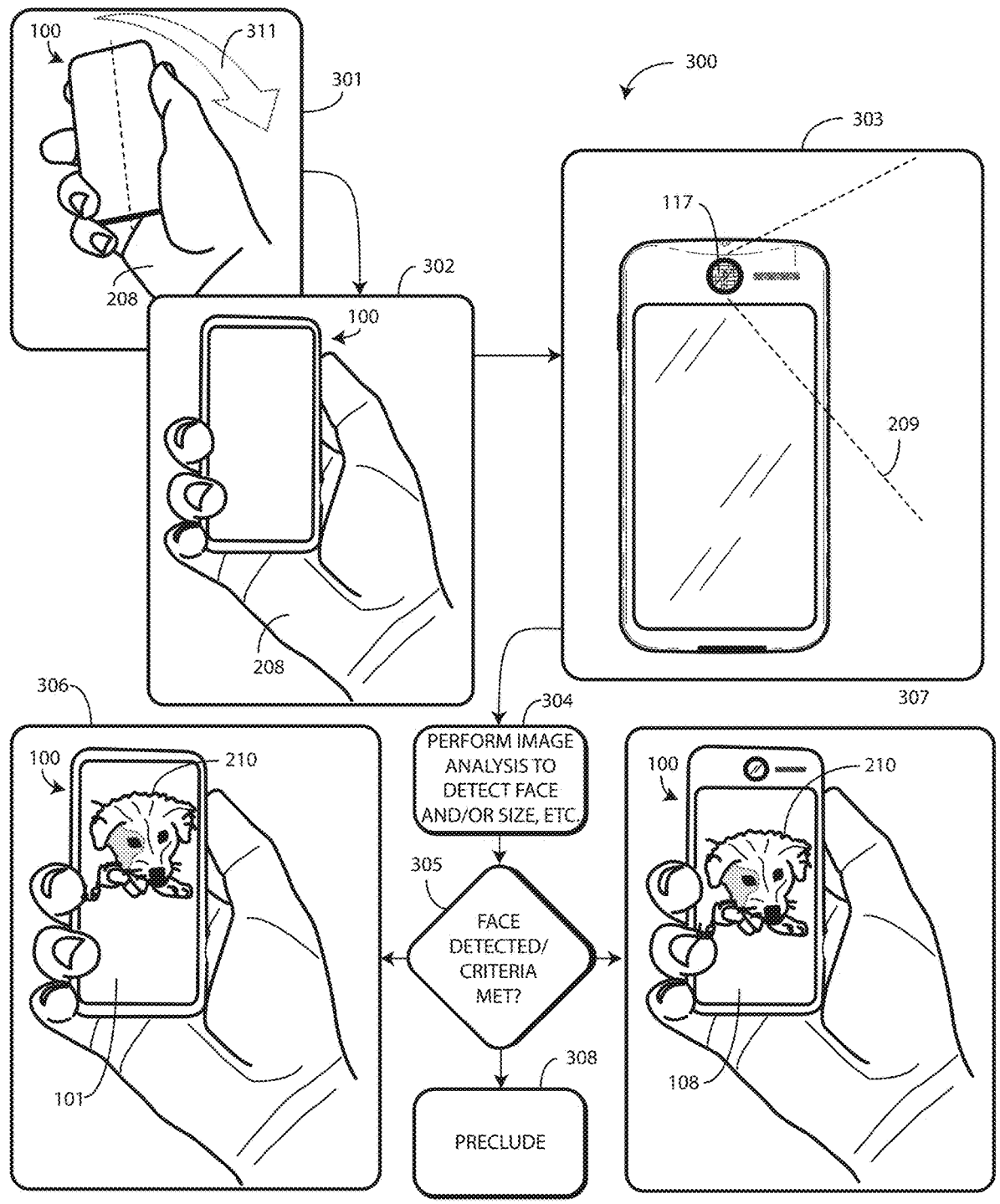
FIG. 3 illustrates one explanatory electronic device executing or more explanatory operating steps in accordance with one or more embodiments of the disclosure.

Turning now to FIG. 3, illustrated therein is another method 300 configured in accordance with one or more embodiments of the disclosure that illustrates how the conditions and criteria of FIG. 6 can be substituted for the user authentication event occurring in the method (200) of FIG. 2 above. With the method 300 of FIG. 3, the predefined event triggering the capture of at least one image 209 by the imager 117 comprises a cessation of rotation of the electronic device 100 in three-dimensional space.

Beginning at step 301, the person 208 is moving 311 the electronic device 100 through three-dimensional space. This not only causes the electronic device 100 to translate through the three-dimensional space, but to rotate as well. At step 302, the user 208 has stopped the movement, thereby causing the electronic device 100 to pause in the three-dimensional space. Embodiments of the disclosure contemplate that it can be beneficial to inquire as to which display content should be presented anytime this occurs. Said differently, in one or more embodiments every time the electronic device 100 comes to a somewhat stationary orientation such as that shown at step 302, this is likely because the person 208 is engaging one of the displays or viewing one of the displays.

Accordingly, in one or more embodiments when motion is followed by a pause, the one or more processors (112) cause the imager 117 to capture at least one image 209 at step 303. Image analysis can then be performed at step 304, with decision 305 determining whether the at least one image 209 matches a predefined criterion, which could be any of those described above with reference to FIG. 2 or FIG. 6.

As before, when the at least one image 209 matches a first predefined criterion, in one or more embodiments the one or more processors (112) of the electronic device 100 cause a presentation of content 210 to occur on the first display 101 at step 306. By contrast, when the at least one image 209 matches a second predefined criterion, the one or more processors (112) can cause the presentation of the content 210 to occur on the second display at step 307. Step 308 can include precluding one or both of the presentation of the content 210 or, where a content presentation is already occurring, the presentation of the content 210 being swapped from one display to the other display, even when the at least one image 209 meets a predefined criterion, as previously described.

Figure 4:
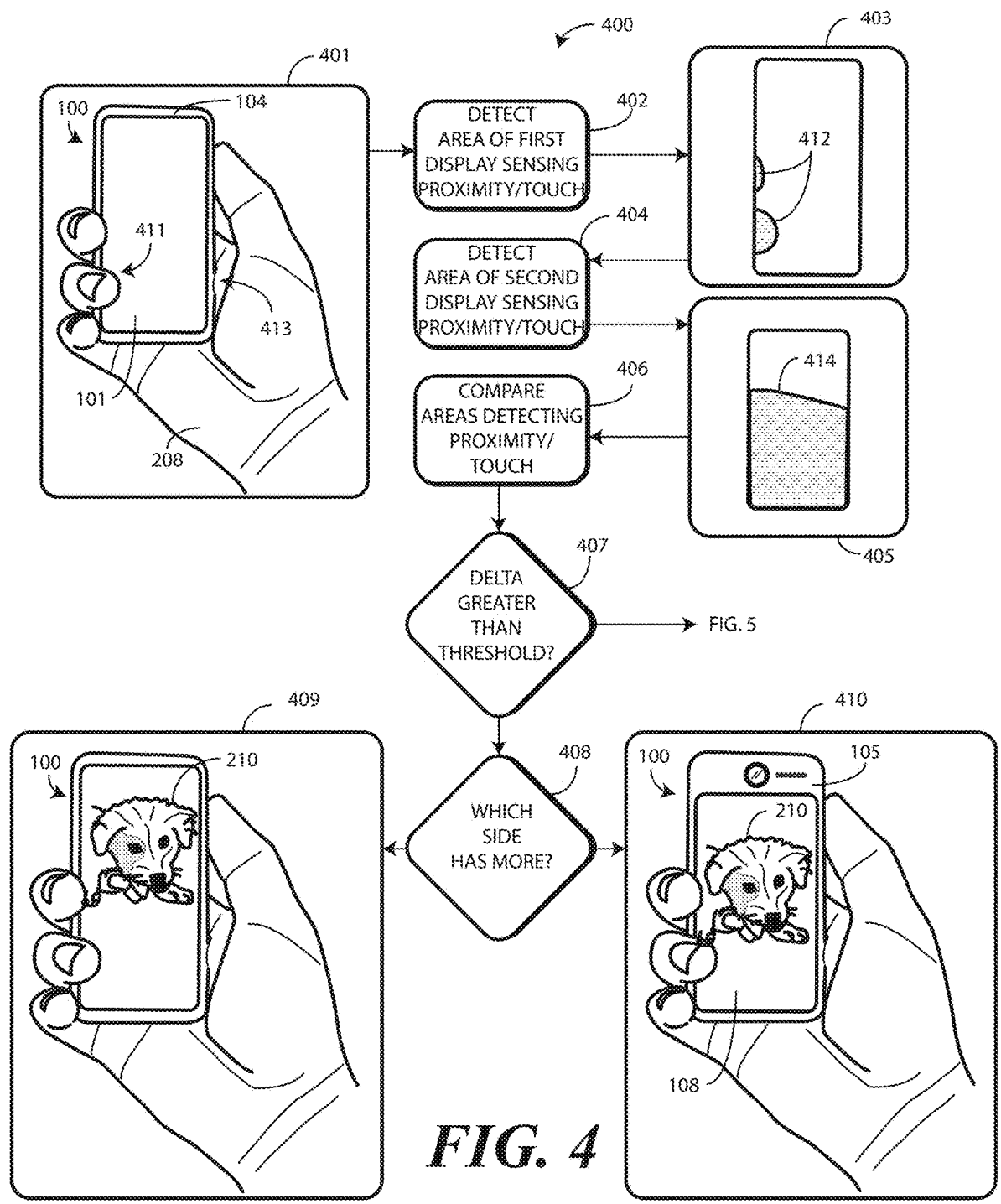
FIG. 4 illustrates one explanatory electronic device executing or more explanatory operating steps in accordance with one or more embodiments of the disclosure.

Turning now to FIG. 4, illustrated therein is another method 400 configured in accordance with one or more embodiments of the disclosure. In the method 400 of FIG. 4, the selection of the first display 101 or the second display 108 for the presentation of content 210 is made as a function of touch rather than whether a captured image matches a predefined condition. Embodiments of the disclosure contemplate that when a person 208 is gripping the electronic device 100, their hand and/or fingers tend to cover more area along one major surface than another. Illustrating by example, at step 401 the person 208 is holding the electronic device 100 with the first major surface 104 facing their face and the second major surface 105 facing their palm.

Accordingly, in one or more embodiments the method 400 of FIG. 4 measures a touch sensitive display portion receiving touch input from the person 208. In one or more embodiments, the one or more processors (112) then cause a presentation of content 210 on the display receiving the least touch input. Said differently, in one or more embodiments the one or more processors (112) cause the presentation of the content 210 to occur in the display having the smallest touch sensitive display portion receiving touch input. As is explained in more detail below, in one or more embodiments the method 400 employs static touch to determine where the presentation of content 210 will occur. This static touch is more continuous than momentary dynamic touch that occurs, for example, when a user is interacting with a display. In one or more embodiments, the one or more processors (112) of the electronic device 100 employ an artificial intelligence engine to distinguish between static and dynamic touch.

Effectively, the method 400 of FIG. 4 measures the total "back touch" area and compares it with total "front touch" area. If the back touch area is greater than the front touch area, in one or more embodiments the one or more processors (112) of the electronic device 100 activate the first display 101. By contrast, if the back touch area is less than the front touch area, the one or more processors (112) activate the second display (108).

In one or more embodiments, the method 400 of FIG. 4 allows the touch sensors (109,110) of the first display 101 and the second display 108 to remain operational when these displays are OFF and not presenting content. The touch sensors (109,110) remain operational in the background for touch sensing.

Consider a cross sectional area of the electronic device 100. In a typical carry mode, one example of which is shown at step 401, the person 208 tends to touch less of the first major surface 104 or first display 101 compared to the second major surface 105 or the second display 108. The person 208 does this so as not to block the view of the first display 101. The second major surface 105 receives more contact because the hand connects the four fingers with the thumb, and the hand runs next to the second display 108. The method 400 of FIG. 4 advantageously presents the content 210 on the display facing the person 208, rather than the display facing the hand.

As shown at step 401, a person 208 is holding the electronic device 100 in their hand. As before, the electronic device 100 includes a first display 101 positioned on the first major surface 104 of the electronic device 100. In this example, the first display 101 comprises a touch sensor (109) and is a touch sensitive display. As shown at step 410, the electronic device 100 also includes a second display 108 positioned on a second major surface 105 of the electronic device. The second display 108, like the first display 101, includes a touch sensor (110) and is therefore a touch sensitive display.

As shown at step 401, the first display 101 is receiving a first user input 411. In this illustrative embodiment, the first user input 411 comprises touch input. However, in other embodiments the user input can comprise proximity input, such as would occur when the user's fingers (or another object such as a stylus) were close enough to, but not touching, the first display 101. Such proximity input can be detected by imagers, the touch sensor (109) of the first display (101), one or more proximity sensors, or by other sensors.

The first user input 411 could also comprise gesture input. Gesture input can comprise translating and/or rotating the electronic device 100 in three-dimensional space, as shown above with reference to FIG. 3, or the electronic device 100 remaining stationary while the person 208 moves their hand (or another object) nearby the electronic device. Such gesture input can be detected by imagers, the touch sensor (109) of the first display (101), one or more proximity sensors, or by other sensors.

At step 402, the one or more processors (112) of the electronic device 100 identify a first touch sensitive display portion 412 of the first display 101 receiving the first user input 411. For the illustrative embodiment of FIG. 4, the first touch sensitive display portion 412 is shown at step 403.

As also shown at step 401, the second display 108 is receiving a second user input 413. In this illustrative embodiment, as with the first user input 411 the second user input 413 comprises touch input. However, in other embodiments the second user input 413 can comprise proximity input, gesture input, or other inputs. Imagers can detect such inputs, the touch sensor (110) of the second display 108, one or more proximity sensors, or by other sensors.

At step 404, the one or more processors (112) of the electronic device 100 identify a second touch sensitive display portion 414 of the second display 108 receiving the second user input 413. For the illustrative embodiment of FIG. 4, the second touch sensitive display portion 414 is shown at step 405.

At step 406, the one or more processors (112) of the electronic device 100 compare the sizes of the first touch sensitive display portion 412 and the second touch sensitive display portion 414. In one or more embodiments, step 406 comprises the one or more processors (112) comparing first touch sensitive display portion 412 and the second touch sensitive display portion 414 to determine which is greater. In another embodiment, step 406 comprises the one or more processors (112) comparing the first touch sensitive display portion 412 and the second touch sensitive display portion 414 to determine whether the difference between the two exceeds a predefined threshold.

Embodiments of the disclosure contemplate that the first touch sensitive display portion 412 can be greater than the second touch sensitive display portion 414, the first touch sensitive display portion 412 can be less than the second touch sensitive display portion 414, or the first touch sensitive display portion 412 and the second touch sensitive display portion 414 can be roughly equal. In one or more embodiments, a predefined threshold, such as ten percent, is used to group the "about equal" determination to anything occurring when the first touch sensitive display portion 412 and the second touch sensitive display portion 414 are within ten percent of each other. In one or more embodiments, whether this occurs is determined at optional decision 407. In one or more embodiments, if the first touch sensitive display portion 412 and the second touch sensitive display portion 414 are equal, or are within a predefined threshold, as determined at decision 407, the method 400 transitions to the method (500) of FIG. 5 below. By contrast, where the first touch sensitive display portion 412 and the second touch sensitive display portion 414, or have a difference exceeding the predefined threshold, the method 400 moves to decision 408.

Decision 408 determines which of the first touch sensitive display portion 412 or the second touch sensitive display portion 414 is greater. In one or more embodiments, when the first touch sensitive display portion is greater than the second touch sensitive display portion, the one or more processors (112) of the electronic device 100 cause the presentation of content 210 to occur on the second display 108 at step 410. By contrast, when the second touch sensitive display portion is greater than the first touch sensitive display portion, the one or more processors (112) cause the presentation of the content 210 to occur on the first display 101 at step 409. In the illustrative embodiment of FIG. 4, step 401 includes the first touch sensitive display portion 412 being less than the second touch sensitive display portion 414, which means the method 400 would conclude at step 409. Step 410 is provided to show the result where the electronic device 100 was rotated 180 degrees about its major axis in step 401.

Where decision 407 is omitted, decision 408 will comprise a straight comparison of the areas of the first touch sensitive display portion 412 and the second touch sensitive display portion 414. If they are equal, the method 400 can transition to the method (500) of FIG. 5. However, absolute equality is unlikely given the high resolution of modern displays. Accordingly, where decision 407 is omitted step 409 will occur when first touch sensitive display portion 412 is less than the second touch sensitive display portion 414.

Similarly, step 410 would occur when the first touch sensitive display portion 412 is greater the second touch sensitive display portion 414.

However, when decision 407 is included, the one or more processors (112) cause the presentation of the content 210 to occur on the second display 108 at step 410 only when the first touch sensitive display portion 412 is greater than the second touch sensitive display portion 414 by more than a predefined threshold. Similarly, the one or more processors (112) cause the presentation of the content 210 to occur on the first display 101 at step 409 only when the second touch sensitive display portion 414 is greater than the first touch sensitive display portion 412 by more than the predefined threshold.

It should be noted that the method 400 of FIG. 4, like the method (200) of FIG. 2 or the method (300) of FIG. 3 above, can be precluded when the person 208 is interacting with one of the displays while the display is presenting content. Known as a static versus dynamic touch override, if the person 208 grabs the electronic device 100 with the first display 101 facing them, as shown at step 401, with the hand covering the second display 108 such that the second touch sensitive display portion 414 is greater than the first touch sensitive display portion 412 or greater than the first touch sensitive display portion 412 by more than the predefined threshold, and then starts typing on the first display 101, it would be desirable not to cause the presentation of content 210 to change when, due to the typing, the first touch sensitive display portion 412 somehow becomes greater than the second touch sensitive display portion 414. Accordingly, in one or more embodiments the first touch sensitive display portion 412 and the second touch sensitive display portion 414 measure only static touch, and do not measure dynamic touch. As used herein, "dynamic" means momentary, as would be the case when the person 208 were typing with one or more fingers. By contrast, static touch remains constant while the dynamic touch is occurring. Thus, in one or more embodiments where, for example, the person 208 starts typing on the first display 101 with multiple fingers, thereby causing the first touch sensitive display portion 412 to exceed the second touch sensitive display portion 414, the presentation of content 210 does not switch to the second display 108. This occurs because the first touch sensitive display portion 412 to exceed the second touch sensitive display portion 414 are measuring static touch and static touch overrides dynamic touch.

It should also be noted that any of the methods described herein could include a temporal component regarding when the presentation of content on which display is evaluated. This temporal component was described above with reference to the conditions of FIG. 6. In one or more embodiments, the one or more processors (112) evaluate whether to cause the presentation of the content 210 to occur on the first display 101 or the second display 108 in response to any of the following predefined events: when the electronic device 100 is unlocked (FIG. 2), after the electronic device 100 finishes a rotation (FIG. 3) such as when being flipped over or picked up, or during a rotation of the electronic device 100. The latter of these conditions contemplates that the person's hand is more likely to be close contact with the second major surface 105 of the electronic device 100 while they are flipping the electronic device 100 over. This latter condition further contemplates that once the person 208 has oriented the electronic device 100 properly, they may slide their grip so that they grip the sides of the electronic device 100 more than the second major surface 105 of the electronic device 100, and so forth. Accordingly, analyzing the first touch sensitive display portion 412 or the second touch sensitive display portion 414 just prior to completing the rotation should be a good indicator of whether to present the content 210 on the first display 101 or the second display 108.

Figure 5:
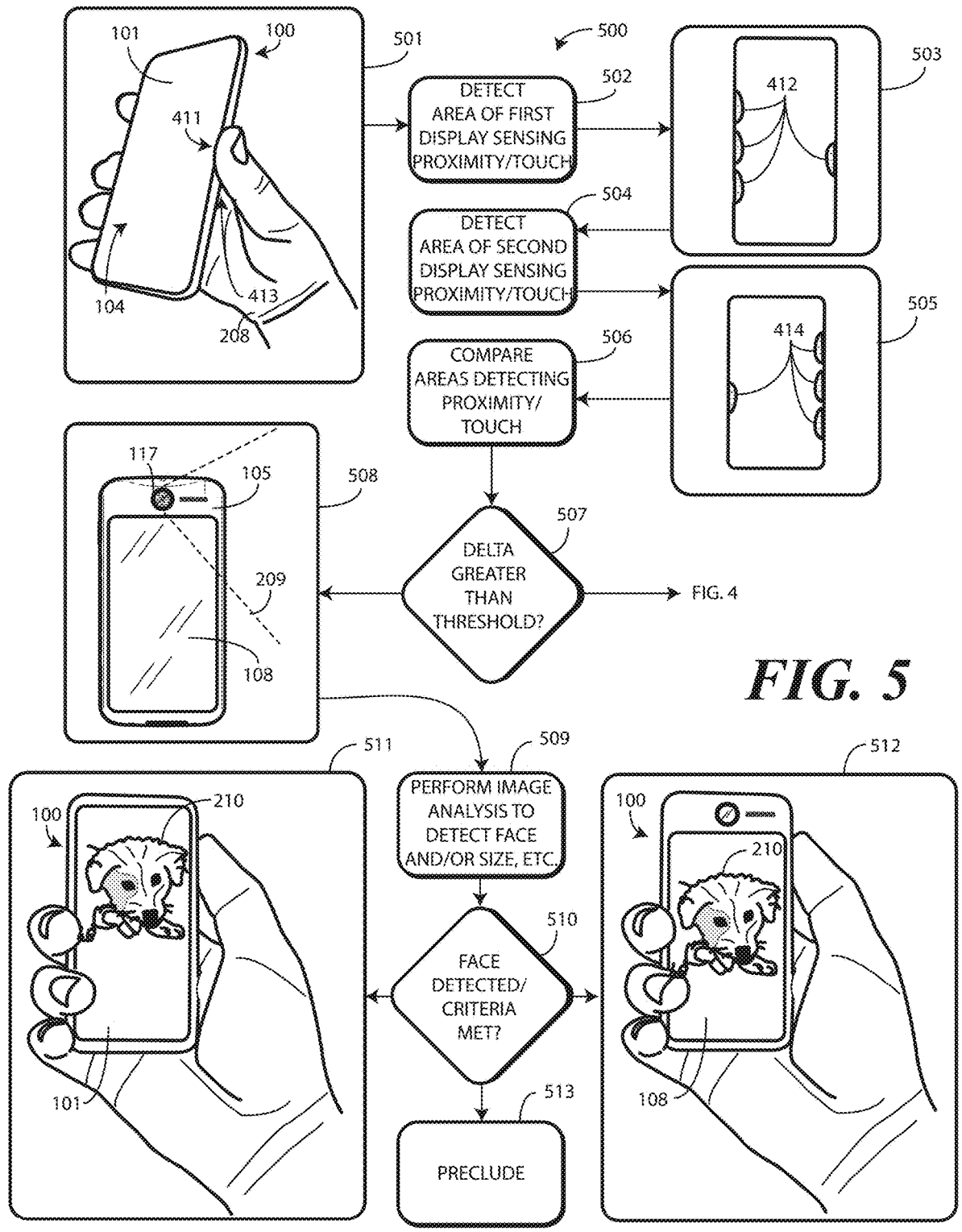
FIG. 5 illustrates one explanatory electronic device executing or more explanatory operating steps in accordance with one or more embodiments of the disclosure.

Turning now to FIG. 5, illustrated therein is a method 500 accommodating situations where the first touch sensitive display portion 412 and the second touch sensitive display portion 414 are equal (where decision 407 is omitted from the method 400 of FIG. 4), or where the first touch sensitive display portion 412 and the second touch sensitive display portion 414 are within a predefined threshold (where decision 407 is included in the method 400 of FIG. 4).

Beginning at step 501, a person 208 is holding the electronic device 100 of FIG. 1. As previously described, the electronic device 100 includes a first display 101 positioned on the first major surface 104 of the electronic device 100. In this example, the first display 101 comprises a touch sensor (109) and is a touch sensitive display. As shown at step 508, the electronic device 100 also includes a second display 108 positioned on a second major surface 105 of the electronic device. The second display 108, like the first display 101, includes a touch sensor (110) and is therefore a touch sensitive display.

As shown at step 501, the first display 101 is receiving a first user input 411. In this illustrative embodiment, the first user input 411 comprises touch input. However, in other embodiments the user input can comprise proximity input, gesture input, or other input.

At step 502, the one or more processors (112) of the electronic device 100 identify a first touch sensitive display portion 412 of the first display 101 receiving the first user input 411. For the illustrative embodiment of FIG. 5, the first touch sensitive display portion 412 is shown at step 503.

As also shown at step 501, the second display 108 is receiving a second user input 413. In this illustrative embodiment, as with the first user input 411 the second user input 413 comprises touch input. However, in other embodiments the second user input 413 can comprise proximity input, gesture input, or other inputs. Imagers can detect such inputs, the touch sensor (110) of the second display 108, one or more proximity sensors, or by other sensors.

At step 504, the one or more processors (112) of the electronic device 100 identify a second touch sensitive display portion 414 of the second display 108 receiving the second user input 413. For the illustrative embodiment of FIG. 5, the second touch sensitive display portion 414 is shown at step 505.

At step 506, the one or more processors (112) of the electronic device 100 compare the sizes of the first touch sensitive display portion 412 and the second touch sensitive display portion 414. In one or more embodiments, step 406 comprises the one or more processors (112) comparing first touch sensitive display portion 412 and the second touch sensitive display portion 414 to determine whether they are equal. In another embodiment, step 506 comprises the one or more processors (112) comparing the first touch sensitive display portion 412 and the second touch sensitive display portion 414 to determine whether the difference therebetween is within a predefined threshold, as previously described.

Where the first touch sensitive display portion 412 and the second touch sensitive display portion 414 are not equal, or alternatively where the difference between the first touch sensitive display portion 412 and the second touch sensitive display portion 414 exceeds the predefined threshold, the method (400) of FIG. 4 can be performed. However, when the first touch sensitive display portion 412 and the second touch sensitive display portion 414 are equal or within the predefined threshold, as determined at decision 507, in one or more embodiments this constitutes a predefined event.

Accordingly, in one or more embodiments the one or more processors (112) cause the imager 117 to capture at least one image 209 at step 508. Image analysis can then be performed at step 509, with decision 510 determining whether the at least one image 209 matches a predefined criterion, which could be any of those described above with reference to FIG. 2 or FIG. 6.

As before, when the at least one image 209 matches a first predefined criterion, in one or more embodiments the one or more processors (112) of the electronic device 100 cause a presentation of content 210 to occur on the first display 101 at step 511. By contrast, when the at least one image 209 matches a second predefined criterion, the one or more processors (112) can cause the presentation of the content 210 to occur on the second display at step 512. Step 513 can include precluding one or both of the presentation of the content 210 or, where a content presentation is already occurring, the presentation of the content 210 being swapped from one display to the other display, even when the at least one image 209 meets a predefined criterion, as previously described.

As illustrated and described above, an electronic device and corresponding methods provide for a device having two or more non-aligned display surfaces. One or more processors of the electronic device select a display surface (or surfaces) to activate, whereby an imager pointed in the same direction as one of the displays is activated at times of potential user interface transitions. In one or more embodiments, if said imager does not detect a face within a specified time and range, its corresponding display surface is not activated.

In some embodiments, the electronic device includes only a single imager positioned on one major surface of the electronic device, while the other major surface of the electronic device is imager-free. However, in other embodiments, both the first major surface and the second major surface include imagers. In one or more embodiments, whichever of the first display or second display is actively presenting content continues to present content unless the imager positioned on the same major surface as the deactivated display sees a face. In this case, the display positioned on the same major surface as the imager detecting the face becomes the active display, with the one or more processors transitioning the presentation of content from the other display to the display positioned on the same major surface as the imager detecting the face. Note that referring to the display as "deactivated" does not necessarily mean that it is not presenting content since not all faces may be detected by algorithm in all lighting conditions in all phone-to-face alignments given a particular imager's field of view. It should also be noted that where an electronic device is equipped with only a single imager, other techniques, including that described above with reference to FIG. 4, can be used to cause the one or more processors to transition the presentation of content from the first display to the second display, or vice versa.

In one or more embodiments, an electronic device and corresponding method for a device with two or more non-aligned display surfaces selects a display surface (or surfaces) to activate for the presentation of content when each display surface is substantially also covered by a touch-sensing surface, and when the display corresponding to whichever touch-sensing surface has the least area sensed as covered by a user's tissue, is activated. As noted above, such an embodiment is not limited to detecting only touch input. Gesture input and proximity input, e.g., a "hover" of the palm slightly above a display, can be used to cause the one or more processors to transition the presentation of content from the first display to the second display, or vice versa.

In situations where the area of touch, gesture, or proximity input is approximately equal, such as when the difference between two areas of touch, gesture, or proximity input is within a predefined threshold, one or more processors can cause an imager to capture at least one image. If said imager does not detect a face within a specified time and range, its corresponding display surface is not activated. It should be noted that any of the electronic devices described above could be configured with a default presentation display, which may be user definable, and which presents content in the event that the methods described above do not resolve to a selection.

It should also be noted that when a display is not presenting content, its corresponding touch sensor can be pulsed—rather than remaining continually ON—to save power. Illustrating by example, in one or more embodiments the touch sensor of a display not presenting content pulses ON and OFF about every 200 millisecond. Accordingly, when the electronic device is positioned on a table, the touch sensor of the upward facing display is OFF. When the electronic device is touched while being positioned on the table, in one or more embodiments the corresponding touch sensor is awakened via an accelerometer. In one or more embodiments, this awakening causes the touch sensor to pulsing every 200 millisecond for touch assessment. If the electronic device is being held in a hand, the accelerometer causes the touch sensor to never go to sleep, but rather to continue to pulse every 200 milliseconds. Different pulsing frequencies can be designed to find the best compromise between lagging/latency and power dissipation, as will be obvious to those of ordinary skill in the art having the benefit of this disclosure.

Figure 7:
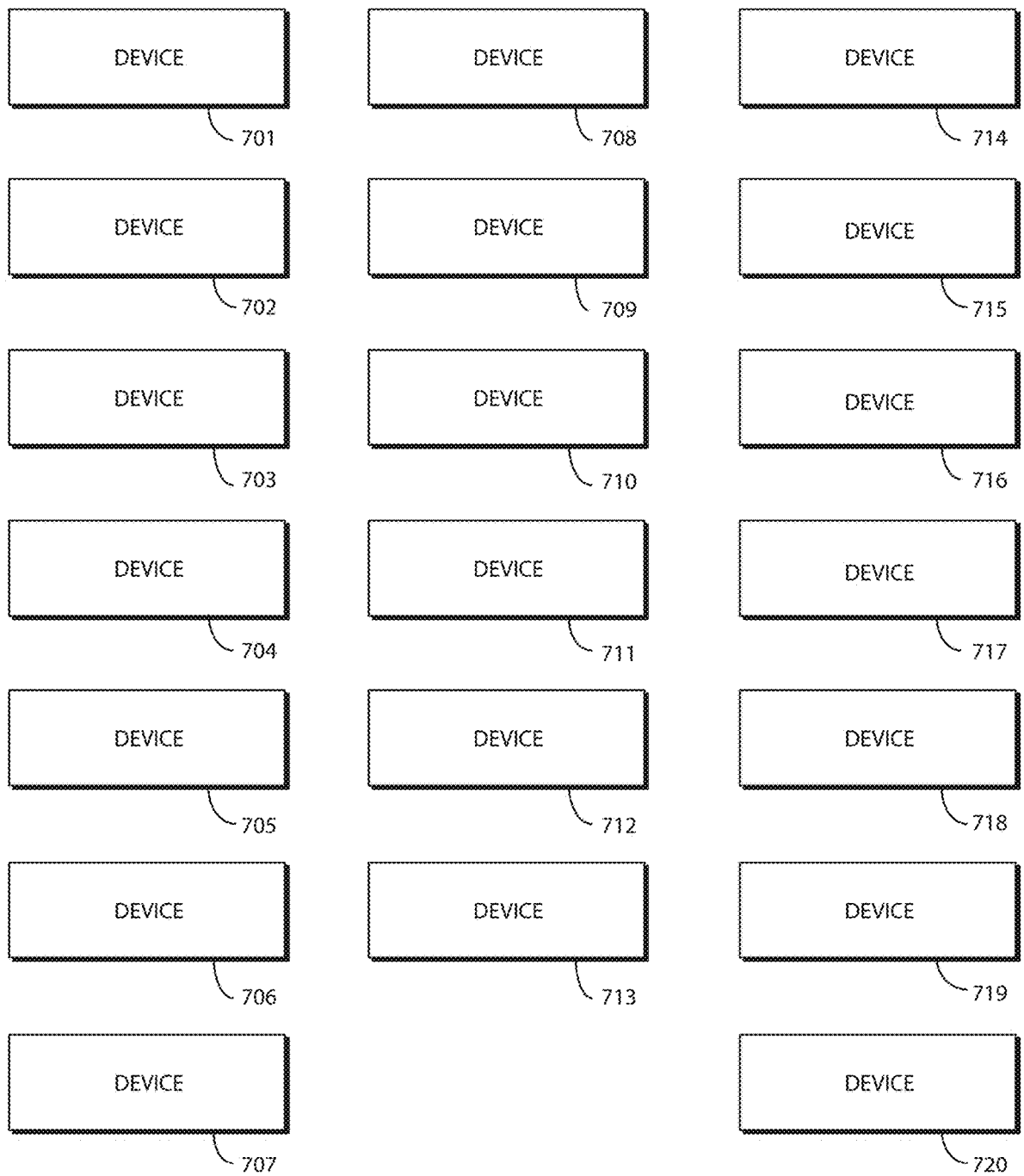
FIG. 7 illustrates various embodiments of the disclosure.

Turning now to FIG. 7, illustrated therein are various embodiments of the disclosure. The embodiments of FIG. 7 are shown as labeled boxes in FIG. 7 due to the fact that the individual components of these embodiments have been illustrated in detail in FIGS. 1-6, which precede FIG. 7. Accordingly, since these items have previously been illustrated and described, their repeated illustration is no longer essential for a proper understanding of these embodiments. Thus, the embodiments are shown as labeled boxes.

At 701, an electronic device comprises a first display positioned on a first major surface of the electronic device. At 701, the electronic device comprises a second display positioned on a second major surface of the electronic device.

At 701, the electronic device comprises an imager positioned on the second major surface of the electronic device. At 701, the electronic device comprises one or more processors operable with the first display, the second display, and the imager.

At 701, the one or more processors identify a predefined event occurring at the electronic device. At 701, and in response to identifying the predefined event, the one or more processors cause the imager to capture at least one image. When the at least one image matches a first predefined criterion, the one or more processors cause a presentation of content to occur on the first display. When the at least one image matches a second predefined criterion, the one or more processors cause the presentation of the content to occur on the second display.

At 702, the second predefined criterion of 701 comprises the at least one image depicting an authorized user of the electronic device looking at the second major surface of the electronic device. At 703, the second predefined criterion of 701 comprises the at least one image depicting a face having a size exceeding a predefined image area threshold.

At 704, the first predefined criterion of 701 comprises the at least one image failing to depict a face. At 705, the first predefined criterion of 701 comprises the at least one image depicting one or more of a hand, a finger, or an inanimate object.

At 706, the predefined event of 701 comprises a user authentication event authorizing an authorized user of the electronic device to use the electronic device. At 707, the predefined event of 701 comprises a cessation of rotation of the electronic device in three-dimensional space.

At 708, the predefined event of 701 comprises an inversion of the electronic device in three-dimensional space. At 709, the one or more processors of 701 cause the imager to capture the at least one image each time the predefined event occurs. At 710, the one or more processors of 701 deactivate the second display when the at least one image matches the first predefined criterion, and deactivate the first display when the at least one image matches the second predefined criterion.

At 711, an electronic device comprises a first touch sensitive display positioned on a first major surface of the electronic device. At 711, the first touch sensitive display receives a first user input across a first touch sensitive display portion.

At 711, the electronic device comprises a second touch sensitive display positioned on a second major surface of the electronic device. At 711, the second touch sensitive display receives a second user input across a second touch sensitive display portion.

At 711, one or more processors are operable with the first touch sensitive display and the second touch sensitive display. At 711, the one or more processors compare sizes of the first touch sensitive display portion and the second touch sensitive display portion.

When the first touch sensitive display portion is greater than the second touch sensitive display portion, the one or more processors cause a presentation of content to occur on the second touch sensitive display. When the second touch sensitive display portion is greater than the first touch sensitive display portion, the one or more processors cause the presentation of the content to occur on the first touch sensitive display.

At 712, one or both of the first user input or the second user input of 711 comprise touch input. At 713, one or both of the first user input or the second user input of 711 comprise proximity input. At 714, one or both of the first user input or the second user input of 711 comprise gesture input.

At 715, the one or more processors of 711 cause the presentation of content to occur on the second touch sensitive display only when the first touch sensitive display portion is greater than the second touch sensitive display portion by more than a predefined threshold. At 715, the one or more processors of 711 cause the presentation of the content to occur on the first touch sensitive display only when the second touch sensitive display portion is greater than the first touch sensitive display portion by more than the predefined threshold.

At 716, an electronic device comprises a first touch sensitive display positioned on a first major surface of the electronic device and receiving a first static user input across a first touch sensitive display portion. At 716, the electronic device comprises a second touch sensitive display positioned on a second major surface of the electronic device and receiving a second static user input across a second touch sensitive display portion.

At 716, the electronic device comprises at least one imager positioned on the second major surface. At 716, the electronic device comprises one or more processors operable with the first touch sensitive display and the second touch sensitive display.

At 716, the one or more processors compare sizes of the first touch sensitive display portion and the second touch sensitive display portion. At 716, when the first touch sensitive display portion and the second touch sensitive display portion are within a predefined area threshold, the one or more processors cause the imager to capture at least one image.

At 716, and when the at least one image matches a first predefined criterion, the one or more processors cause a presentation of content to occur on the first touch sensitive display. At 716, and when the at least one image matches a second predefined criterion, the one or more processors cause the presentation of the content to occur on the second touch sensitive display.

At 717, the second predefined criterion of 716 comprises the at least one image depicting an authorized user of the electronic device looking at the second major surface of the electronic device. At 718, the second predefined criterion of 716 comprises the at least one image depicting a face having a size exceeding a predefined image area threshold.

At 719, the first predefined criterion of 716 comprises the at least one image failing to depict a face. At 720, the first predefined criterion of 716 comprises the at least one image depicting one or more of a hand, a finger, or an inanimate object.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a first display positioned on a first major surface of the electronic device;
   a second display positioned on a second major surface of the electronic device;
   an imager positioned on the second major surface of the electronic device; and
   one or more processors operable with the first display, the second display, and the imager;
   the one or more processors identifying a predefined event occurring at the electronic device and, in response to identifying the predefined event, causing the imager to capture at least one image;

wherein:

when the at least one image matches a first predefined criterion, the one or more processors cause a presentation of content to occur on the first display;

when the at least one image matches a second predefined criterion, the one or more processors cause the presentation of the content to occur on the second display; and the predefined event comprises a user authentication event authorizing an authorized user of the electronic device to use the electronic device;

the first predefined criterion comprising the at least one image failing to depict a face.

2. The electronic device of claim 1, the second predefined criterion comprising the at least one image depicting an authorized user of the electronic device looking at the second major surface of the electronic device.

3. The electronic device of claim 1, the second predefined criterion comprising the at least one image depicting a face having a size exceeding a predefined image area threshold.

4. The electronic device of claim 3, the predefined image area threshold comprising at least twenty-five percent of the at least one image.

5. The electronic device of claim 1, the first predefined criterion further comprising the at least one image depicting only inanimate objects.

6. The electronic device of claim 1, the second predefined criterion further comprising the at least one image depicting an arm extending from a torso of an authorized user of the electronic device.

7. The electronic device of claim 6, the second predefined criterion further comprising the at least one image depicting the authorized user of the electronic device looking at the second major surface of the electronic device with a face of the authorized user situated within a predefined distance of the electronic device.

8. The electronic device of claim 7, the predefined distance defined by a reach of the arm.

9. The electronic device of claim 1, wherein the user authentication event comprises a delivery of fingerprint data triggering the imager capturing at least one image.

10. The electronic device of claim 1, the one or more processors deactivating the second display and deactivating the first display when the at least one image is captured while the electronic device is in a pocket.

11. An electronic device, comprising:

a first touch sensitive display positioned on a first major surface of the electronic device and receiving a first user input across a first touch sensitive display portion;

a second touch sensitive display positioned on a second major surface of the electronic device and receiving a second user input across a second touch sensitive display portion; and one or more processors operable with the first touch sensitive display and the second touch sensitive display;

the one or more comparing sizes of the first touch sensitive display portion and the second touch sensitive display portion;

wherein:

when the first touch sensitive display portion is defined by a hand or fingers covering more area along the first touch sensitive display than along the second touch sensitive display the one or more processors cause a presentation of content to occur on the second touch sensitive display; and when the second touch sensitive display portion is defined by the hand or the fingers covering more area along the second touch sensitive display than along the first touch sensitive display the one or more processors cause the presentation of the content to occur on the first touch sensitive display;

further comprising an imager, wherein when the first touch sensitive display portion and the second touch sensitive display portion are within a predefined threshold of each other the one or more processors cause the imager to capture at least one image, wherein the one or more processors cause the one or more processors to cause the presentation of the content on the first touch sensitive display when the at least one image fails to depict a face.

12. The electronic device of claim 11, wherein touch sensors of the second touch sensitive display remain operational when the second touch sensitive display is OFF and not presenting content.

13. The electronic device of claim 11, wherein the imager is situated on the second major surface of the electronic device.

14. The electronic device of claim 11, wherein the predefined threshold is ten percent.

15. The electronic device of claim 11, wherein the one or more processors preclude the comparing the sizes of the first touch sensitive display portion and the second touch sensitive display portion when content is being presented on one of the first touch sensitive display or the second touch sensitive display while the one of the first touch sensitive display or the second touch sensitive display is receiving dynamic touch input.

16. An electronic device, comprising:

a first touch sensitive display positioned on a first major surface of the electronic device and receiving a first static user input across a first touch sensitive display portion;

a second touch sensitive display positioned on a second major surface of the electronic device and receiving a second static user input across a second touch sensitive display portion;

at least one imager positioned on the second major surface; and one or more processors operable with the first touch sensitive display and the second touch sensitive display;

the one or more processors comparing sizes of the first touch sensitive display portion and the second touch sensitive display portion and, when the first touch sensitive display portion and the second touch sensitive display portion are within a predefined area threshold, the one or more processors cause the imager to capture at least one image;

wherein:

when the at least one image matches a first predefined criterion, the one or more processors cause a presentation of content to occur on the first touch sensitive display;

when the at least one image matches a second predefined criterion, the one or more processors cause the presentation of the content to occur on the second touch sensitive display; and the second predefined criterion comprises the at least one image depicting an authorized user of the electronic device looking at the second major surface of the electronic device;

the first predefined criterion comprising the at least one image failing to depict a face.

17. The electronic device of claim 16, wherein the first touch sensitive display and the second touch sensitive display are oppositely facing.

18. The electronic device of claim 16, the first predefined criterion comprising the at least one image failing to depict the authorized user looking at the second major surface of the electronic device.

19. The electronic device of claim 16, second predefined criterion comprising the at least one image depicting a face occupying at least twenty five percent of the at least one image.

20. The electronic device of claim 16, the first predefined criterion comprising the at least one image depicting one or more of a hand, a finger, or an inanimate object.

* * * * *